United States Patent
Inaoka et al.

(10) Patent No.: US 7,364,001 B2
(45) Date of Patent: Apr. 29, 2008

(54) ENGINE MOUNTING STRUCTURE FOR MOTORCYCLE

(75) Inventors: Hiroshi Inaoka, Saitama (JP); Satoru Nojiri, Saitama (JP); Norihiko Sasaki, Saitama (JP); Hirohisa Takahashi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 369 days.

(21) Appl. No.: 11/081,544

(22) Filed: Mar. 17, 2005

(65) Prior Publication Data

US 2005/0205328 A1    Sep. 22, 2005

(30) Foreign Application Priority Data

Mar. 19, 2004  (JP) .............................. 2004-080768

(51) Int. Cl.
  *B62M 7/00*  (2006.01)
(52) U.S. Cl. ...................................................... 180/228
(58) Field of Classification Search ................ 180/228, 180/227

See application file for complete search history.

(56) References Cited

U.S. PATENT DOCUMENTS

| | | | | | |
|---|---|---|---|---|---|
| 4,412,597 | A | * | 11/1983 | Aiba ........................... | 180/228 |
| 5,639,075 | A | * | 6/1997 | Tyree .......................... | 267/281 |
| 6,349,785 | B1 | * | 2/2002 | Ohmika et al. ............. | 180/227 |
| 6,513,613 | B2 | * | 2/2003 | Suzuki et al. ............... | 180/227 |
| 6,547,024 | B2 | * | 4/2003 | Ohyama et al. ............. | 180/227 |
| 6,588,530 | B2 | * | 7/2003 | Keller et al. ................ | 180/228 |
| 6,651,767 | B2 | * | 11/2003 | Izawa et al. ................ | 180/219 |
| 6,758,296 | B2 | * | 7/2004 | Inaoka et al. ............... | 180/228 |
| 6,808,465 | B2 | * | 10/2004 | Kuga et al. ................... | 474/14 |
| 6,851,499 | B2 | * | 2/2005 | Yagisawa et al. ........... | 180/219 |
| 2003/0159873 | A1 | * | 8/2003 | Inaoka et al. ............... | 180/228 |

FOREIGN PATENT DOCUMENTS

| | | |
|---|---|---|
| EP | 1186526 A | 3/2002 |
| JP | 01273781 A | 11/1989 |
| JP | 2002-79983 A | 3/2002 |

* cited by examiner

Primary Examiner—Lesley D. Morris
Assistant Examiner—Daniel Yeagley
(74) Attorney, Agent, or Firm—Birch, Stewart, Kolasch & Birch, LLP

(57) ABSTRACT

A motorcycle has an engine mounting structure in which a rear wheel supporting swing arm is vertically swung together with a rear wheel, and in which both sides in the vehicle body width direction of a vehicle body side bracket provided in a vehicle body frame are clamped between a left-right pair of engine-side brackets provided on an engine and the engine is mounted to the vehicle body side bracket through elastic members. The vehicle body frame includes a left-right pair of auxiliary brackets disposed on both sides of the vehicle body side bracket, with an interval therebetween. The left and right engine-side brackets are clamped by the auxiliary brackets. An engine supporting bolt is made to penetrate through the vehicle body side bracket, the left and right engine-side brackets and the left and right auxiliary brackets, whereby the brackets are connected to each other.

19 Claims, 7 Drawing Sheets

ENGINE MOUNTING STRUCTURE FOR MOTORCYCLE

CROSS-REFERENCE TO RELATED APPLICATIONS

The present application claims priority under 35 USC 119 to Japanese Patent Application No. 2004-080768 filed on Mar. 19, 2004 the entire contents of which are hereby incorporated by reference.

BACKGROUND OF THE INVENTION

1. Field of the Invention

The present invention relates to an engine mounting structure for a motorcycle.

2. Description of Background Art

There is a motorcycle in which an engine is mounted to a vehicle body frame and a rear wheel supporting swing arm is vertically swingably mounted to the engine. See, Japanese Patent Laid-open No. 2002-79983, FIGS. 5 and 6.

The conventional motorcycle shown in Japanese Patent Laid-open No. 2002-79983 includes an engine mounting structure in which a cross member is bridgingly disposed between a left-right pair of frame members of the vehicle body frame, a vehicle body side bracket is provided at a nearly intermediate portion of the cross member with both sides in the vehicle body width direction of the vehicle body side bracket being clamped between a left-right pair of engine-side brackets provided on the engine. The engine is mounted to the vehicle body side bracket through engine support bolts and an elastic member with the rear wheel supporting swing arm being vertically swingably mounted to the engine.

When a motorcycle is operated, the rear wheel is vibrated according to the conditions of the road surface, and the vibration (hereinafter referred to as "the operating vibration") is transmitted from the rear wheel to the engine through the swing arm. Since the elastic member moderates the operating vibration, it is difficult for the vibration to be transmitted from the engine to the vehicle body frame.

In such a configuration, in order to further reduce the operating vibration transmitted from the engine to the vehicle body frame, it may be contemplated to lower the hardness of the elastic member. However, in the motorcycle, it is required to secure the feeling of unity between the vehicle body frame and the engine in the cases of, for example, operating while turning. Therefore, there is a limitation in simply lowering the hardness of the elastic member.

SUMMARY AND OBJECTS OF THE INVENTION

It is an object of the present invention to provide a technology which makes it possible to achieve both (1) a sufficiently secure feeling of the unity between a vehicle body frame and an engine in the cases where, for example, a motorcycle operates while turning; and (2) to further reduce the operating vibration transmitted from the engine to the vehicle body frame.

The present invention provides an engine mounting structure for a motorcycle such that a rear wheel supporting swing arm is vertically swung together with the vertical swinging of a rear wheel with both sides in the vehicle body width direction of a vehicle body side bracket being provided in a vehicle body frame that is clamped between a left-right pair of engine-side brackets provided on an engine. The engine is mounted to the vehicle body side bracket through an elastic member wherein the vehicle body frame includes a left-right pair of auxiliary brackets disposed oil both sides of the vehicle body side bracket with an interval therebetween. The left-right pair of engine-side brackets are clamped between the left-right pair of auxiliary brackets with engine support bolts penetrating through the vehicle body side bracket, the left-right pair of engine-side brackets and the left-right pair of auxiliary brackets for connecting the brackets to each other.

In the present invention at least one of the left-right pair of auxiliary brackets is composed of a bracket base portion half with provided in the vehicle body frame, and a bracket tip end portion with half detachably attached to the bracket base portion half. The bracket tip end portion half is connected to the engine-side bracket by the engine support bolts.

The present invention provides a vehicle body frame that includes a left-right pair of vehicle body side upper brackets provided at other positions than the positions of the vehicle body side bracket and the left-right pair of auxiliary brackets and on the upper side relative to the swinging center of the rear wheel supporting swing arm swingably mounted to the engine. The engine is provided with an engine-side upper bracket at another position than the positions of the left-right pair of engine-side brackets and on the upper side relative to the swinging center. The engine-side upper bracket is clamped between the left-right pair of vehicle body side upper brackets, whereby an upper portion of the engine is mounted to the left-right pair of vehicle body side upper brackets through an upper elastic member.

The present invention provides a vehicle body frame that includes a cross member disposed on the lower side of a cylinder head of the engine and extends in the vehicle body width direction. The vehicle body side bracket extends rearwardly and upwardly from the cross member. The left-right pair of bracket base portion halves extend upwards from the cross member. The left-right pair of bracket tip end halves extend from the left-right pair of bracket base portion halves toward the vehicle body side bracket and are connected by the engine support bolts. The vehicle body side bracket, the bracket base portion half and the bracket tip end half are disposed in a roughly triangular form as viewed from a vehicle body lateral side.

The present invention provides the left-right pair of bracket base portion halves that are roughly L-shaped as viewed from the tip end side.

The present invention includes the left-right pair of bracket tip end portion halves that are connected to the left-right pair of bracket base portion halves respectively at upper and lower two points, and are connected to the engine at one of the points of connection by the engine support bolts.

The present invention includes a flanged collar with the engine support bolt passed therethrough that is interposed at least left or right with respect to one of the portions between the left-right pair of engine-side brackets and the left-right pair of auxiliary brackets. The flange is directed toward an end surface of the engine-side bracket on the side on which the flanged collar is interposed.

According to the present invention, the vehicle body frame is provided with the left-right pair of auxiliary brackets disposed on both sides in the vehicle body width direction of the vehicle body side bracket, in addition to the vehicle body side bracket, whereby the left-right pair of engine-side brackets clamping therebetween both sides in the vehicle width direction of the vehicle body side bracket are further clamped between the left and right auxiliary brackets, and the brackets are connected by passing the engine support bolts through the brackets.

As a result, vibrations of the engine relative to the vehicle body frame can be restricted, irrespectively of the hardness of the elastic member for mounting the engine on the vehicle body side bracket. Therefore, it is possible to sufficiently secure the feeling of unity between the vehicle body frame and the engine in the cases where, for example, the motorcycle operates while turning, and to further reduce the operating vibration transmitted from the engine to the vehicle body frame, through lowering the hardness of the elastic member. Accordingly, the riding comfort of the motorcycle including the rear wheel supporting swing arm mounted to the engine can be further enhanced.

Further, according to the present invention, the engine-side bracket is clamped between the left-right pair of auxiliary brackets possessed by the vehicle body frame, so that the engine can be restrained from being changed in the vehicle body width direction relative to the vehicle body frame during operating of the motorcycle. Therefore, the riding comfort of the motorcycle can be further enhanced.

Furthermore, since the engine-side bracket is clamped between the left-right pair of auxiliary brackets possessed by the vehicle body frame, dispersion of the mounting accuracy between the vehicle body frame and the engine in the vehicle body width direction can be restrained.

According to the present invention, the support rigidity in supporting the engine by the left-right pair of auxiliary brackets can be easily regulated to an optimum level, by changing the rigidity of the bracket tip end portion half detachable from the bracket base portion half, the rigidity is changed by, for example, changing the shape, plate thickness, or material.

According to the present invention, the engine-side upper bracket is clamped between the left-right pair of vehicle body side upper brackets at other positions than the positions of the vehicle body side bracket and the left-right pair of auxiliary brackets of the vehicle body frame and on the upper side relative to the swinging center of the rear wheel supporting swing arm swingably mounted to the engine, whereby an upper portion of the engine is mounted to the left and right vehicle body side upper brackets through an upper elastic member.

The operating vibration transmitted from the rear wheel to the engine through the swing arm can be moderated by also absorbing the vibration by the upper elastic member of the left and right vehicle body side upper brackets disposed on the upper side relative to the swinging center. Therefore, the riding comfort of the motorcycle can be further enhanced.

Furthermore, the support rigidity of the supporting portions for supporting the engine by only the left and right vehicle body side upper brackets is lower than the support rigidity of the supporting portions for supporting the engine by cooperation of the vehicle body side bracket and the left-right pair of auxiliary brackets. Thus, it is possible to restrain the burden on the supporting portions for supporting the engine by the left and right vehicle body side upper brackets. The supporting portions are provided on the upper side relative to the swinging center of the swing arm.

According to the present invention, the engine supporting portion is configured in a roughly triangular form as viewed from a vehicle body lateral side, so that the support rigidity can be further enhanced.

According to the present invention, the left-right pair of bracket base portion halves are roughly L-shaped as viewed from the tip end side, whereby the support rigidity can be enhanced with a simple configuration.

According to the present invention, the bracket tip end portion half is connected to the vehicle body side bracket and the bracket base portion half possessed by the vehicle body frame, at three points forming a roughly triangular shape as viewed from a vehicle body lateral side, so that the connection rigidity and the support rigidity of the bracket tip end portion half can be enhanced.

According to the present invention, the flanged collar with the engine support bolt passed therethrough is interposed between the engine-side bracket and the auxiliary bracket, for assembly of the latter. As a result, a space corresponding to the length of the collar can be provided between the left and right auxiliary brackets. At the time of mounting the engine onto the frame, it suffices to finally mount the flanged collar in position. Since the space corresponding to the axial length of the collar is provided, it is easy to match the positions of the left and right engine-side brackets between the engine-side bracket and the left and right auxiliary brackets.

Therefore, mountability is good, notwithstanding the complicated configuration in which the left-right pair of engine-side brackets clamping therebetween both sides in the vehicle body width direction of the vehicle body side bracket are further clamped by the left and right auxiliary brackets, and these brackets are connected by passing the engine support bolts through the brackets.

Further, since the flange of the collar is directed to the end surface of the engine-side bracket, the load in the vehicle body width direction exerted from the engine-side bracket can be received more satisfactorily.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The best mode for carrying out the present invention will be described below, based on the accompanying drawings. The terms "front (forward)," "rear (rearward)," "left (leftward)," "right (rightward)," "upper (upward)," and "lower (downward)" are used in accordance with the directions as viewed from the rider with Fr indicating the front side, Rr indicating the rear side, L indicating the left side, R indicating the right side, and CL indicating the vehicle body center (vehicle width center).

Figure 1:
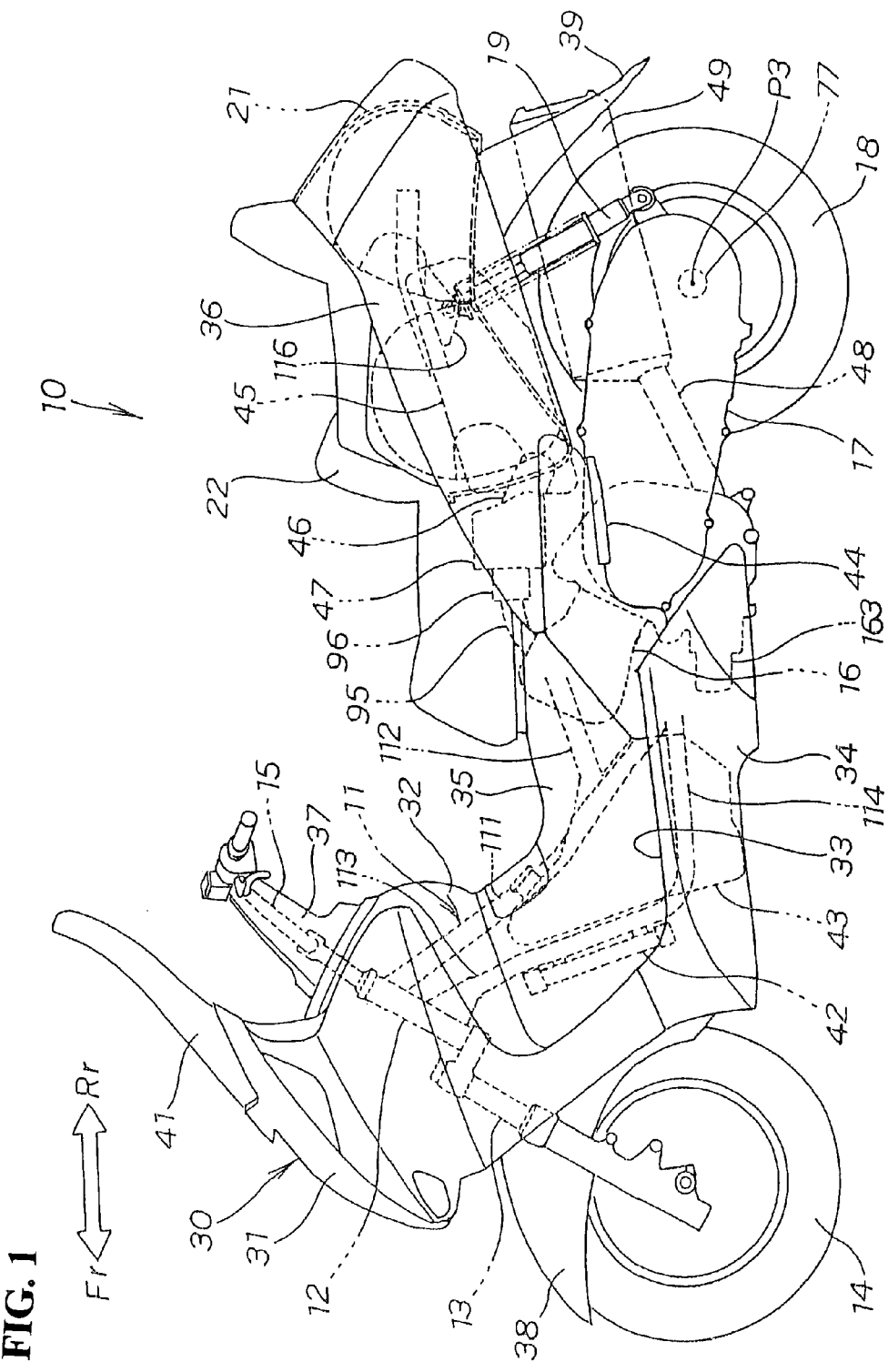
FIG. 1 is a left side view of a motorcycle according to the present invention.

FIG. 1 is a left side view of a motorcycle according to the present invention. The motorcycle 10 is a motor scooter type motorcycle including, as principal components, a vehicle body frame 11, a front fork 13 mounted to a head pipe 12 of the vehicle body frame 11, a front wheel 14 mounted to the front fork 13, a steering handle 15 connected to the front fork 13, an engine 16 mounted to a rear portion of the vehicle body frame 11, a power transmission mechanism 17 vertically swingably mounted to the engine 16, a rear wheel 18 mounted to the power transmission mechanism 17, a rear cushion unit 19 suspending a rear end portion of the power transmission mechanism 17 on the vehicle body frame 11, a luggage box 21 mounted to a rear upper portion of the vehicle body frame 11, and a seat 22 openably and closably disposed on the luggage box 21. The seat 22 is a double seat.

The motorcycle 10 has a body cover 30 covering the vehicle body frame 11. The body cover 30 is composed of a front cover 31 for covering a front portion of the head pipe 12, an inner cover 32 for covering a rear portion of the front cover 31, left and right low floor type foot rest plates (floor steps) on which to position the rider's feet, left and right floor skirts 34 extended downwardly from outer edges of the low floor type foot rest plates 33, a center cover 35 extended rearwardly from the inner cover 32 so as to cover the center in the longitudinal direction of the vehicle body frame 11, and a rear cover 36 extended rearwardly from the center cover 35 so as to cover a rear portion of the vehicle body frame 11.

In FIG. 1, a steering handle cover 37 is provided together with a front fender 38, a rear fender 39, a windscreen 41, an engine-cooling radiator 42, a fuel tank 43, a passenger step 44, an air cleaner 45, a connecting tube 46, an air chamber 47, an engine exhaust pipe 48, and an exhaust muffler 49.

Figure 2:
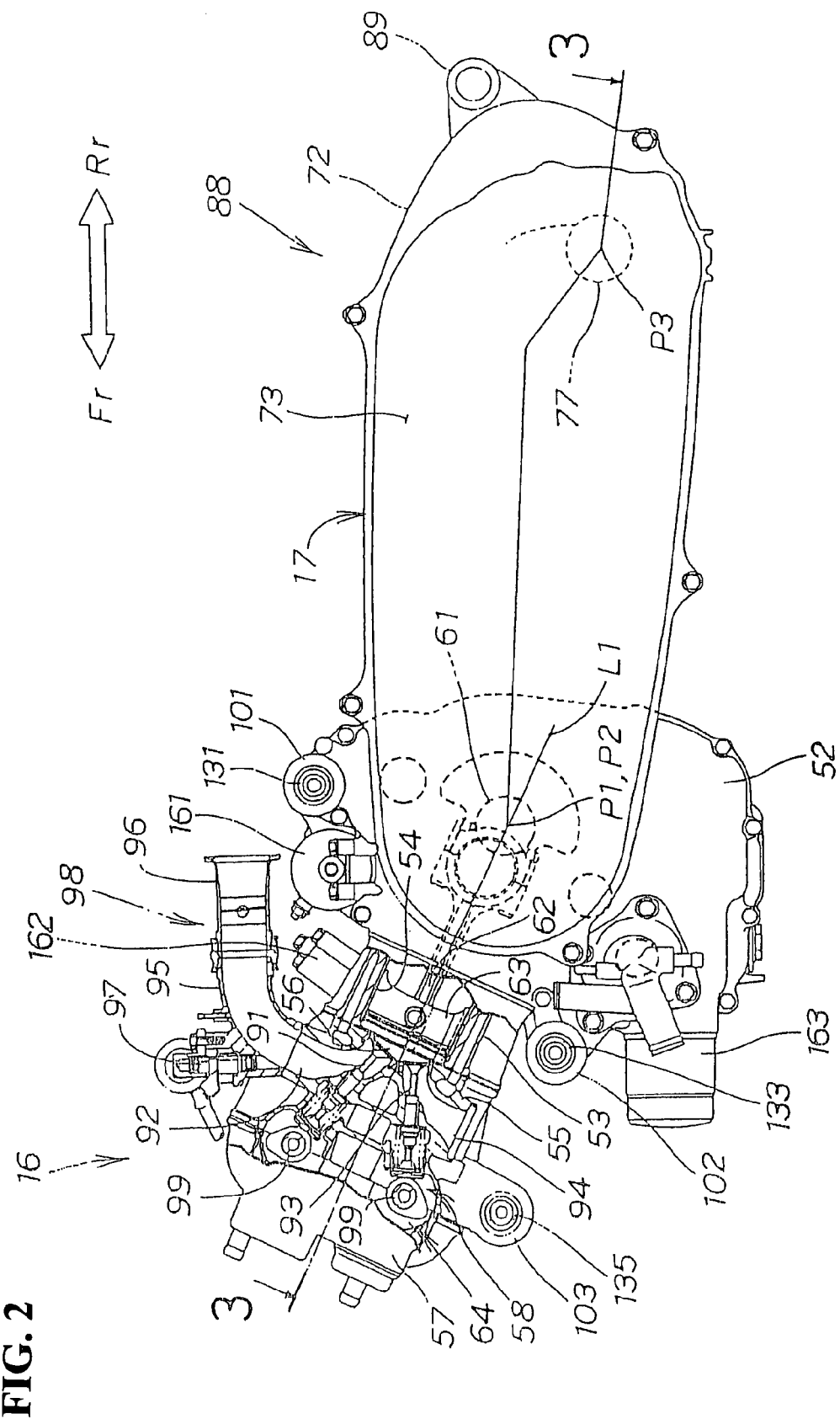
FIG. 2 is a left side view of an engine and a power transmission mechanism according to the present invention.

FIG. 2 is a left side view of the engine and the power transmission mechanism according to the present invention.

The engine 16 is a 4-cycle 2-cylinder type water-cooled engine having a cylinder 54 extending forwardly from a crankcase 52. The axis of the cylinder 54 is denoted by L1.

The engine 16 includes a starter motor 161 provided at an upper portion of the crankcase 52, a cam chain tensioner lifter 162 provided at an upper portion of a cylinder block 53, and an oil filter 163 provided at a lower portion of the crankcase 52 and having its axis directed forwardly.

Figure 3:
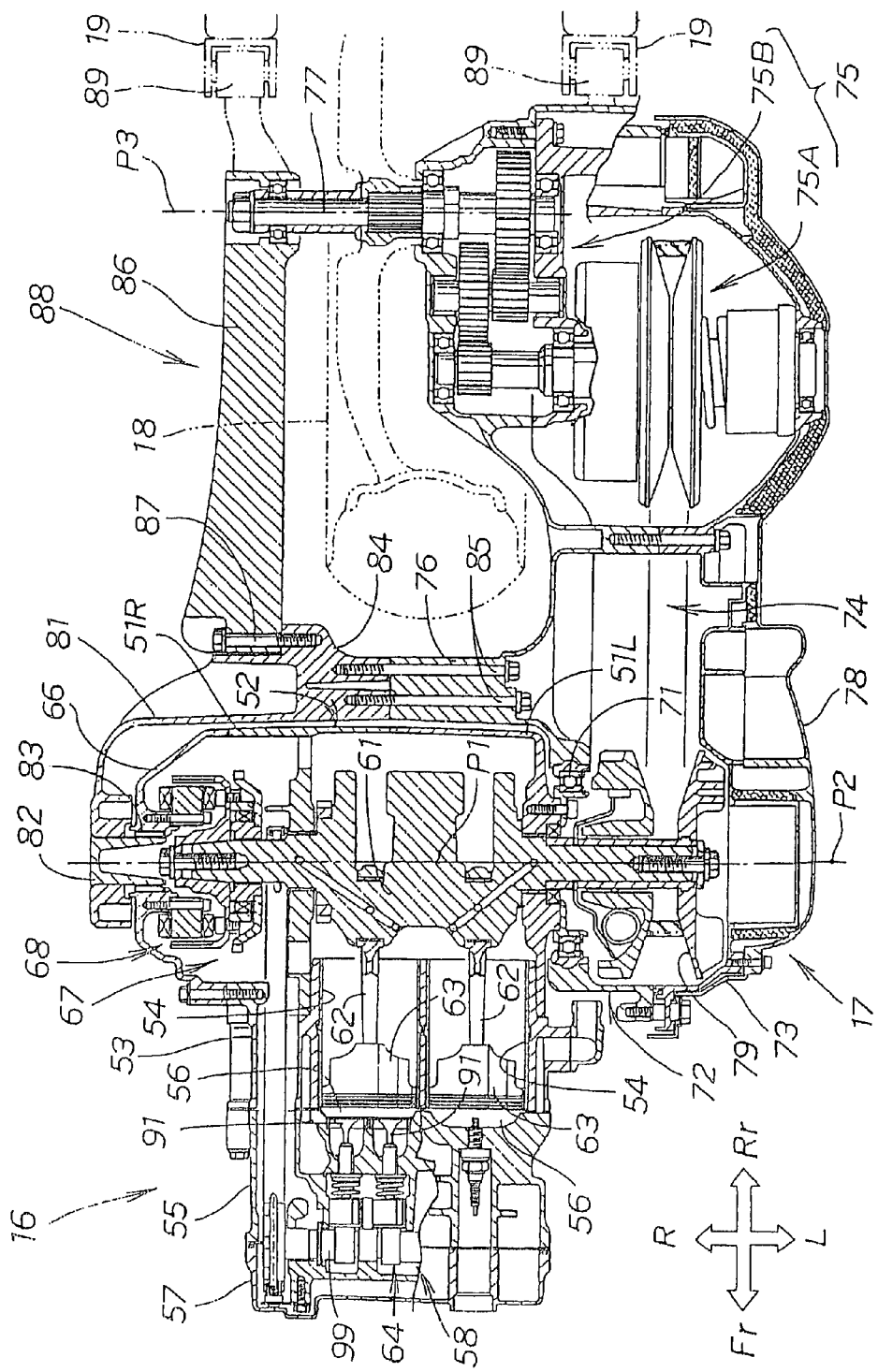
FIG. 3 is a sectional view along line 3-3 of FIG. 2.

FIG. 3 is a sectional view along line 3-3 of FIG. 2. A case portion of the engine 16 is composed of the crankcase 52 composed of left and right case halves 51L, 51R connected to each other by bolts. The cylinder block 53 are bolt-connected to a front portion of the crankcase 52 with left and right two cylinders 54, 54 being provided inside the cylinder block 53. A cylinder head 55 is bolt-connected to a front portion of the cylinder block 53 with combustion chambers 56, 56 being formed in the cylinder head 55. A head cover 57 is bolt-connected to a front portion of the cylinder head 55 with a valve chamber 58 being formed between the cylinder head 55 and the head cover 57.

Further, the engine 16 is composed of a crankshaft 61 rotatably mounted to the crankcase 52 and extending in the left-right direction, pistons 63, 63 connected to the crankshaft 61 through connecting rods 62, 62 and reciprocated in the cylinders 54, 54, and a valve mechanism 64 contained in the valve chamber 58.

A generator cover 66 is bolt-connected to a right side portion of the right case half 51R, whereby a generator containing chamber 67 is formed between the right case half 51R and the generator cover 66, and a generator 68 is contained in the generator containing chamber 67. The generator 68 is connected to a right end portion of the crankshaft 61.

Since the generator cover 66 is fixed to the crankcase 52, it is dealt with as a part of the crankcase 52, in the present invention.

The power transmission mechanism 17 is composed of a transmission mechanism case 72 having a front portion vertically swingably mounted to the left case half 51L through a bearing 71 and extending rearwardly. A case cover 73 is provided for closing an opening formed in a side portion of the transmission mechanism case 72. A transmission mechanism containing a chamber 74 is formed between the transmission mechanism case 72 and the case cover 73. A transmission mechanism 75 is contained in the transmission mechanism containing chamber 74. The transmission mechanism case 72 is provided with a boss portion 76 projecting from an intermediate portion in the longitudinal direction thereof toward the vehicle body center side.

The transmission mechanism 75 has a combined structure of a belt-type speed change mechanism 75A connected to the crankshaft 61 and a gear mechanism 75B connected to the belt-type speed change mechanism 75A, in which a rear wheel axle 77 is connected to the output side of the gear mechanism 75B, and the rear wheel axle 77 is supported rotatably. A cover 78 is provided for covering the outer sides in the vehicle width direction of the case cover 73.

The generator cover 66 has a front arm 81 vertically swingably mounted thereto. More specifically, a support shaft 82 is integrally provided at a front portion of the front arm 81, and the support shaft 82 is rotatably borne on the generator cover 66 through a bearing 83.

The front arm 81 extends rearwardly with a boss portion 84 projecting from the rear end of the front arm 81 to the vehicle width center side along a rear portion of the crankcase 52. The boss portion 76 of the transmission mechanism case 72 is connected to the boss portion 84 by bolts 85, 85. Further, a rear arm 86 is connected to a rear portion of the front arm 81 by a bolt 87. The rear arm 86 extends rearwardly, and a rear end portion thereof supports the rear wheel axle 77 in a rotatable condition.

Such a combined structure of the transmission mechanism case 72 with the front and rear arms 81, 86 constitutes a rear fork (swing arm) 88 which is roughly H-shaped in plan view. Therefore, front portions of the rear fork 88 supporting the rear wheel 18 thereon through the rear wheel axle 77 can be vertically swingably mounted to the crankcase 52. Accordingly, the rear fork 88 is vertically swung in conjunction with the vertical swinging of the rear wheel 18.

The present invention is characterized in that the swinging center P2 of the rear fork 88, i.e., the swinging center P2 of the transmission mechanism case 72 and the front arm 81, is made to coincide with the center P1 of the crankshaft 61.

If the swinging center P2 of the rear fork 88 does not coincide with (is offset from) the center P1 of the crankshaft 61, the swing angle of the mechanism (transmission mechanism) for transmitting power from the crankshaft 61 to the rear wheel 18 differs from the swing angle of the rear fork 88. Therefore, the configuration of the transmission mechanism must necessarily be complicated.

On the other hand, in the present invention, the swinging center P2 of the rear fork 88 coincides with the center P1 of the crankshaft 61. More specifically, a drive pulley 79 of the transmission mechanism 75 is connected directly to the crankshaft 61, whereby the center on the input side of the transmission mechanism 75 and the swinging center P2 of the transmission mechanism case 72 are made to coincide with the center P1 of the crankshaft 61. As a result, the swing angle of the transmission mechanism 75 is equal to the swing angle of the rear fork 88. Accordingly, the transmission mechanism 75 (the mechanism for transmitting the power from the crankshaft 61 to the rear wheel 18) is simplified.

Further, FIG. 2 illustrates the brackets 89, 89 for connecting lower portions of the left and right rear shock absorbers 19, 19 that are provided at the rear end of the transmission mechanism case 72 and the rear end of the rear arm 86.

Referring to FIG. 2, the cylinder head 55 has an intake port 92 being continuous with the combustion chamber 56 and provided with an intake valve 91. An exhaust port 94 is provided that is continuous with the combustion chamber 56 and is provided with an exhaust valve 93, which ports are formed integrally. When the engine 16 is viewed from a lateral side, the intake port 92 is an opening directed upwardly, while the exhaust port 94 is an opening directed downwardly.

An inlet pipe 95 connected to the intake port 92 extends to the rear side of the cylinder head 55, and a throttle valve 96 is connected to the rear end (upstream end) thereof. The upstream end of the throttle valve 96 is directed rearwardly. The inlet pipe 95 is fitted with a fuel injection system (injector) 97 for injecting a fuel toward the intake valve 91.

Such a combined structure of the intake port 92, the inlet pipe 95 and the throttle body 96 constitutes an intake passage 98. In other words, the intake passage 98 extends rearwardly from an upper portion of the cylinder 54, and an intake port of the intake passage 98 is directed rearwardly. The intake port of the intake passage 98, i.e., the upstream end of the throttle valve 96, is connected to the air cleaner 45 through the air chamber 47, as shown in FIG. 1. Camshafts 99, 99 are provided for the valve mechanism 64.

The engine 16 has a structure in which the crankcase 52 is provided with an upper mount bracket 101 and a lower mount bracket 102, and the cylinder head 55 is provided with a front mount bracket 103 at a lower portion thereof. More specifically, the upper mount bracket 101 is provided on an upper level relative to the cylinder 54, and the lower mount bracket 102 and the front mount bracket 103 are provided at lower levels relative to the cylinder 54.

The upper mount bracket 101 will be referred to as "the engine-side upper bracket 101 provided on the engine 16," as required. In addition, the lower mount bracket 102 and the front mount bracket 103 will be referred to as "the engine-side brackets 102, 103 provided on the engine 16," as required.

Figure 4:
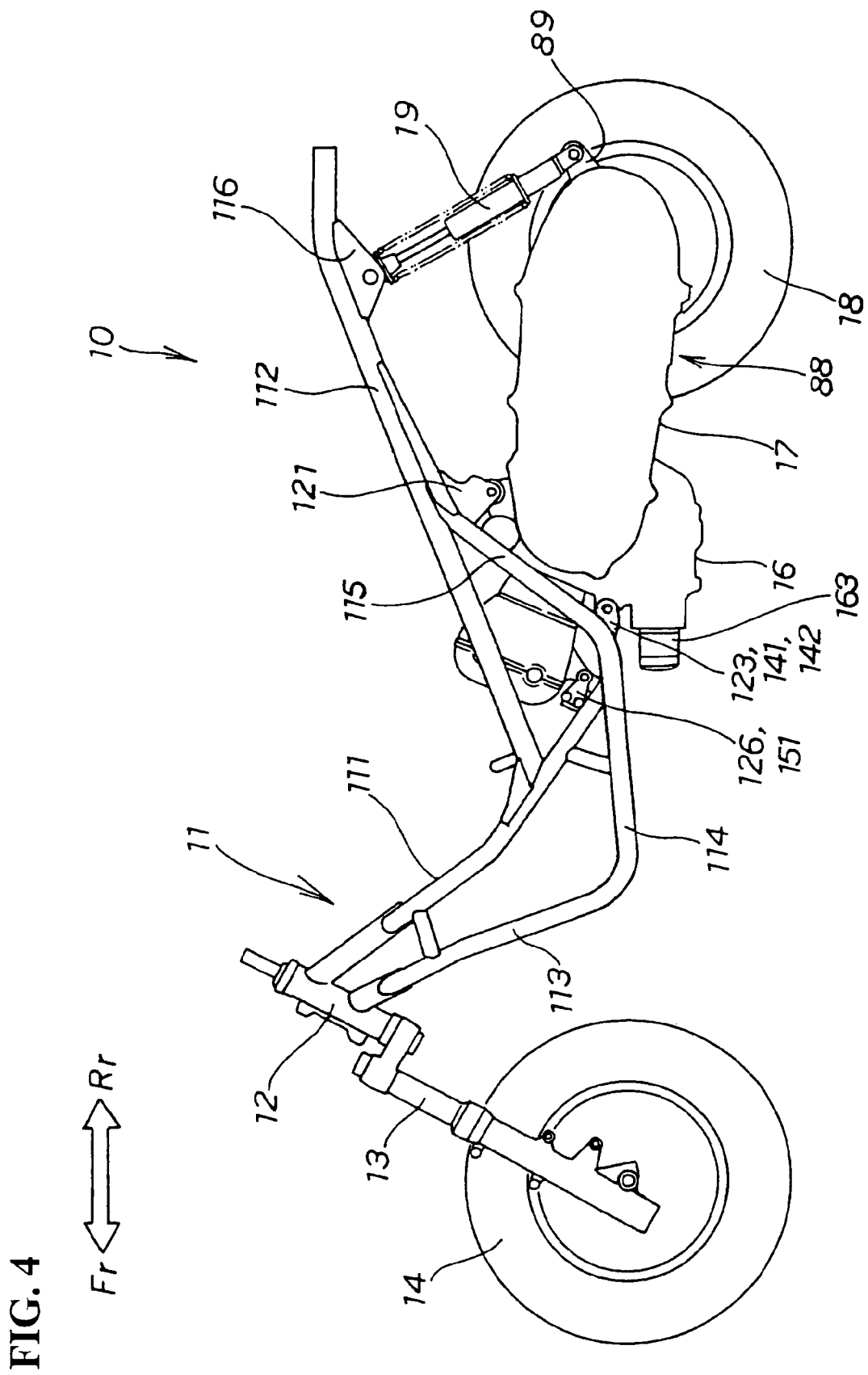
FIG. 4 is a left side view of a vehicle body frame according to the present invention.

FIG. 4 is a left side view of the vehicle body frame according to the present invention. The vehicle body frame 11 is a double cradle type frame in which a main pipe 111 extends rearwardly and downwardly from the head pipe 12 with a seat rail 112 that extends rearwardly and upwardly from a longitudinal intermediate portion of the main pipe 111, while a down pipe 113 extends rearwardly and downwardly from the head pipe 12 on the lower side of the main pipe 111. A lower pipe 114 extends rearwardly from the lower end of the down pipe 113 with the lower end of the main pipe 111 being joined to a longitudinal intermediate portion of the lower pipe 114. An upper pipe 115 (rising frame member) extends rearwardly and upwardly from the rear end of the lower pipe 114 with the rear end of the upper pipe 115 being joined to a longitudinal intermediate portion of the seat rail 112.

As illustrated in FIG. 4, the brackets 116, 116 for connecting upper portions of the left and right rear shock absorbers 19, 19 (in FIG. 4 only the left side located on the viewer's side is shown, here and hereinafter) are provided at rear portions of the seat rail 112. The rear shock absorbers 19, 19 are connected between the brackets 89, 89 of the rear fork 88 and the brackets 116, 116 of the seat rail 112, whereby rear left and right portions of the rear fork 88 can be suspended from the vehicle body frame 11 through the rear shock absorbers 19, 19.

Figure 5:
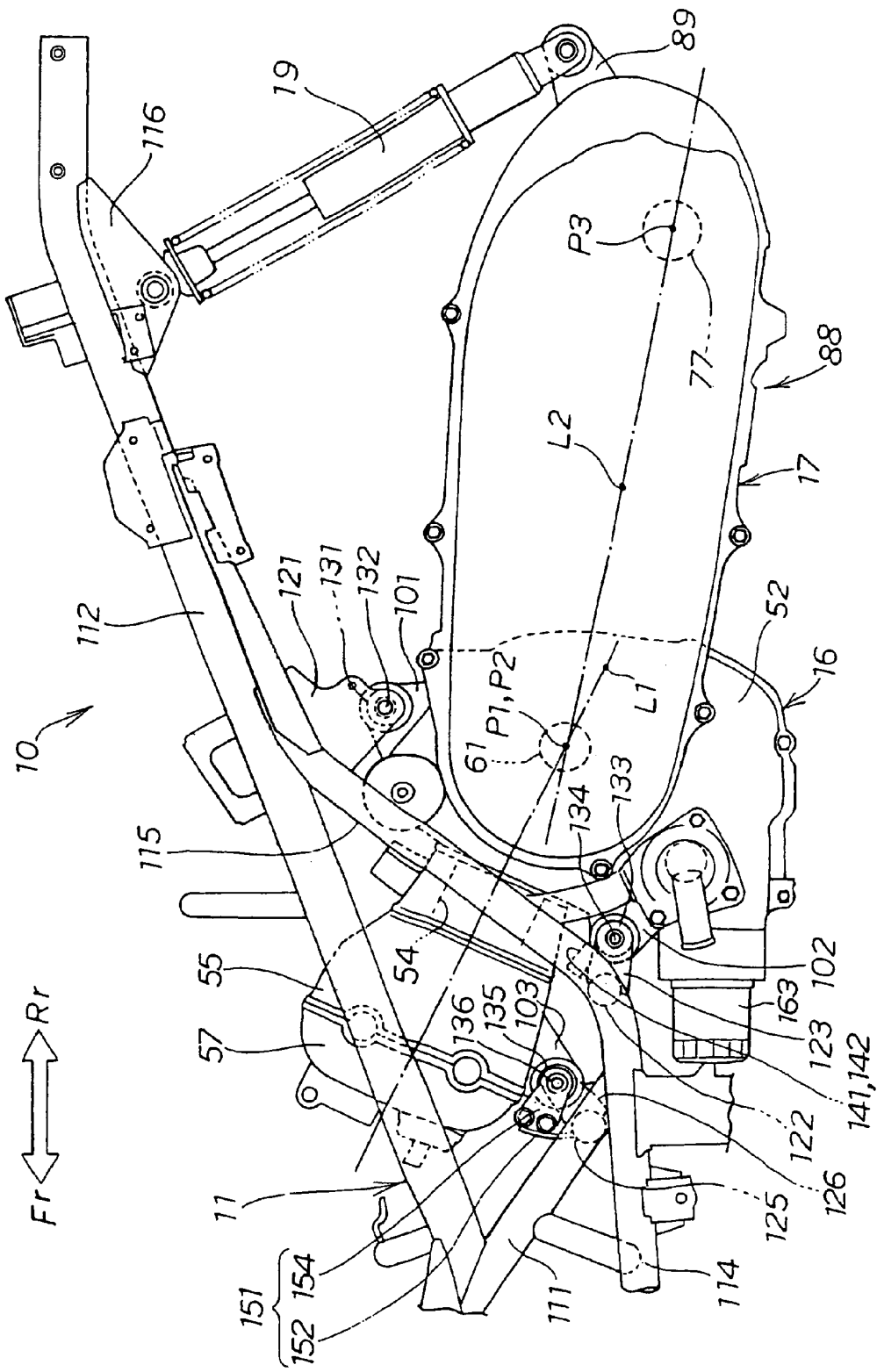
FIG. 5 is a left side view of a rear portion of the vehicle body frame, the engine and the power transmission mechanism according to the present invention.

FIG. 5 is a left side view of a rear portion of the vehicle body frame, the engine and the power transmission mechanism according to the present invention. The left and right upper pipes 115, 115 (in FIG. 5, only the left side located on the viewer's side is shown, here and hereinafter) as rising frame members of the vehicle body frame 11 are members which intersect the cylinder 54 substantially orthogonally, i.e., intersect the cylinder axis L1 substantially orthogonally, in a side view. The left and right upper pipes 115, 115 are provided with left and right upper brackets 121, 121 at upper end portions thereof, a first cross member 122 is bridgingly disposed between lower end portions of the left and right upper pipes 115, 115, and the first cross member 122 is provided with a lower bracket 123. On the other hand, a second cross member 125 is bridgingly disposed between lower end portions of the left and right main pipes 111, 111, and the second cross member 125 is provided with a front bracket 126. Thus, the second cross member 125 is a member which is disposed on the lower side of the cylinder head 55 of the engine 16, which extends in the vehicle body width direction, and is provided in the vehicle body frame 11.

The line passing through the center P1 of the crankshaft 61 and the center P3 of the rear wheel axle 77 is denoted by L2.

Figure 6:
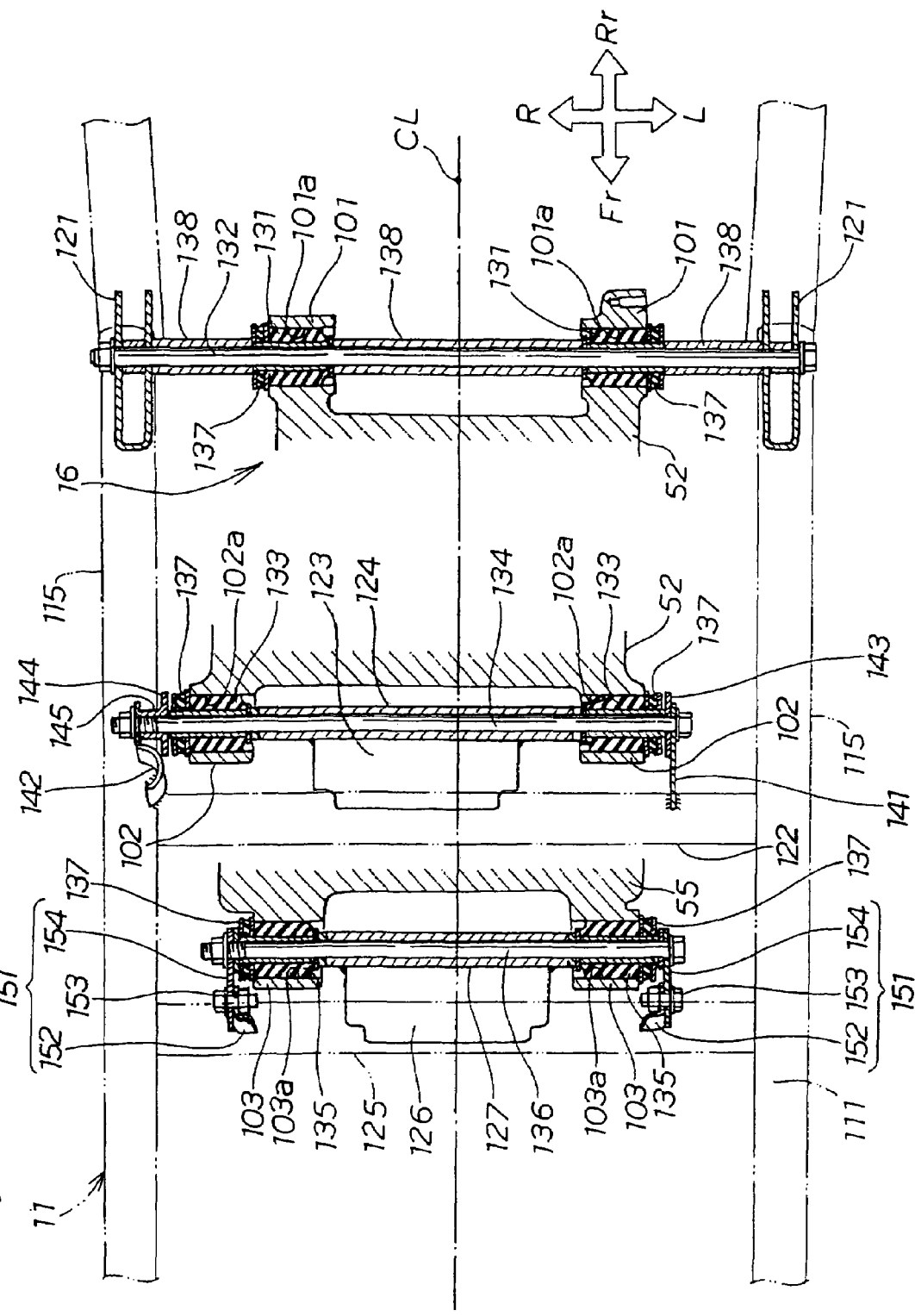
FIG. 6 is a plan view of an engine mounting portion according to the present invention.

FIG. 6 is a plan view of an engine mounting portion according to the present invention, showing a structure in which the engine 16 is mounted to the vehicle body frame 11 indicated by imaginary lines.

FIG. 6 shows that (1) the left and right upper pipes 115, 115 are provided with the left and right upper brackets 121, 121; (2) the first cross member 122 is bridgingly disposed between the left and right upper pipes 115, 115, the first cross member 122 is provided with the lower bracket 123, and the lower bracket 123 is provided with a pipe-shaped lower pivot portion 124 extending in the vehicle body width direction (left-right direction); and (3) the second cross member 125 is bridgingly disposed between the left and right main pipes 111, 111. The second cross member 125 is provided with the front bracket 126. The front bracket 126, extending in the vehicle body width direction (left-right direction), is provided with a pipe-shaped front pivot portion 127, as above-mentioned.

The upper bracket 121 will be referred to as "the vehicle body side upper bracket 121 provided in the vehicle body frame 11," as required. In addition, the lower bracket 123 and the front bracket 126 will be referred to as "the vehicle body side brackets 123, 126 provided in the vehicle body frame 11," as required.

The vehicle body frame 11 includes (1) a left-right pair of auxiliary brackets 141, 142 disposed on both sides of the lower bracket 123 present at the vehicle width center, with an interval therebetween, and includes (2) a left-right pair of auxiliary brackets 151, 151 disposed on both sides of the front bracket 126 present at the vehicle width center, with an interval therebetween.

More specifically, the vertical plate-like left auxiliary bracket 141 extends rearwardly from the left side of the first cross member 122, and the right auxiliary bracket 142 extends rearwardly from the right upper pipe 115 while being attached along the right upper pipe 115. The left and right auxiliary brackets 151, 151 are provided on both the left and right sides of the second cross member 125.

A first mounting structure of the engine 16 is a structure in which the left and right upper mount brackets 101, 101, provided on the crankcase 52, are provided with bushing holes 101a, 101a, annular rubber bushings 131, 131 are fitted in the bushing holes 101a, 101a, and the rubber bushings 131, 131 and the left and right upper brackets 121, 121 are collectively fixed by a single pivot shaft 132 extending in the left-right direction.

A second mounting structure of the engine 16 is a structure in which the left and right lower mount brackets 102, 102 provided on the crankcase 52 are provided with bushing holes 102a, 102a, annular rubber bushings 133, 133 are fitted in the bushing holes 102a, 102a, and the rubber bushings 133, 133 and the lower pivot portion 124 are collectively fixed by a single pivot shaft 134 extending in the left-right direction.

In other words, the second mounting structure is a structure in which both sides in the vehicle body width direction of the lower bracket 123, i.e., both sides of the lower pivot portion 124, are clamped between the left-right pair of lower mount brackets 102, 102, and the engine 16 is mounted to the lower bracket 123 through the rubber bushings 133, 133.

A third mounting structure of the engine 16 is a structure in which the left and right front mount brackets 103, 103, provided on the cylinder head 55, are provided with bushing holes 103a, 103a, annular rubber bushings 135, 135 are fitted in the bushing holes 103a, 103a, and the rubber bushings 135, 135 and the front pivot portion 127 are collectively fixed by a single pivot shaft 136 extending in the left-right direction.

In other words, the third mounting structure is a structure in which both sides in the vehicle body width direction of the front bracket 126, i.e., both sides of the front pivot portion 127, are clamped between the left-right pair of front mount brackets 103, 103, and the engine 16 is mounted to the vehicle body side bracket 123 through the rubber bushings 135, 135.

The rubber bushings 131, 133, 135 are vibration-absorbing elastic members for the engine 16. The rubber bushing 131 will be referred to as "the upper elastic member," as required. The rubber bushings 133, 135 will be referred to as "the elastic members," as required.

The pivot shafts 132, 134, 136 are composed of engine support bolts, i.e., bolt-nut units. In the figure, 137 . . . (. . . indicates a plurality, here and hereinafter) denote left and right vibration-absorbing elastic members for the engine 16, and 138 . . . denote collars.

The present invention is characterized in that the engine 16 is thus mounted to the vehicle body frame 11 through the rubber bushings 131, 133, 135 (elastic members), i.e., the engine 16 is rubber-mounted.

The first, second and third mounting structures of the engine 16 will be described more in detail, based on FIGS. 5 to 8.

Figure 7:
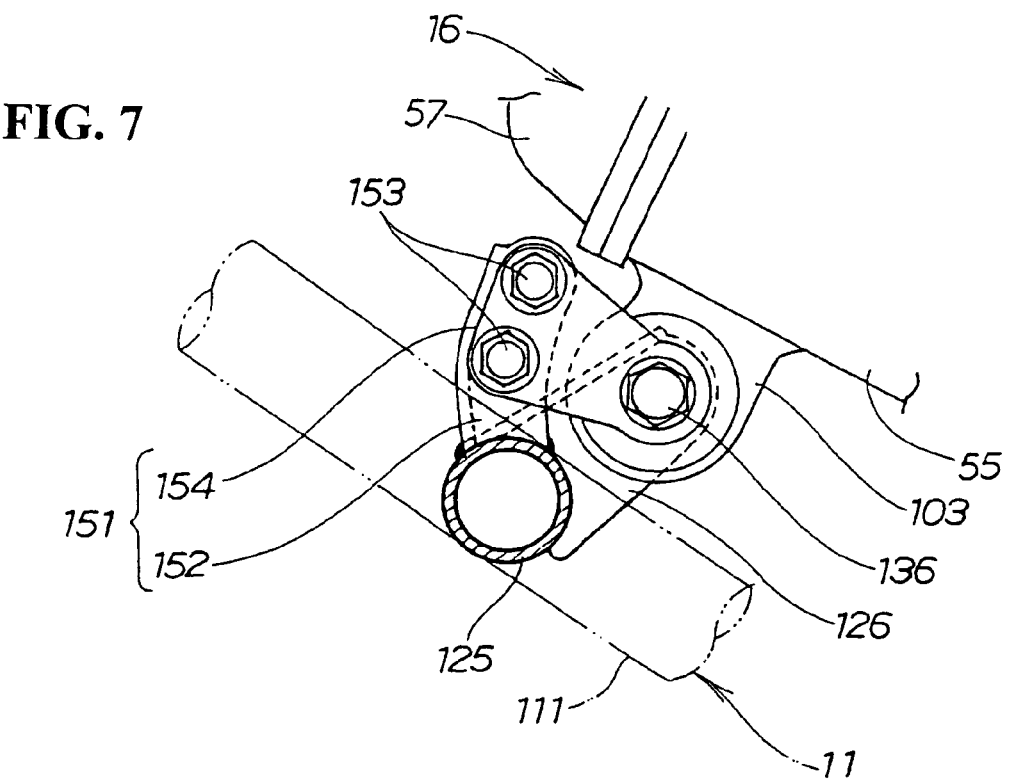
FIG. 7 is a left side view of a third mounting structure of the engine.
Figure 8:
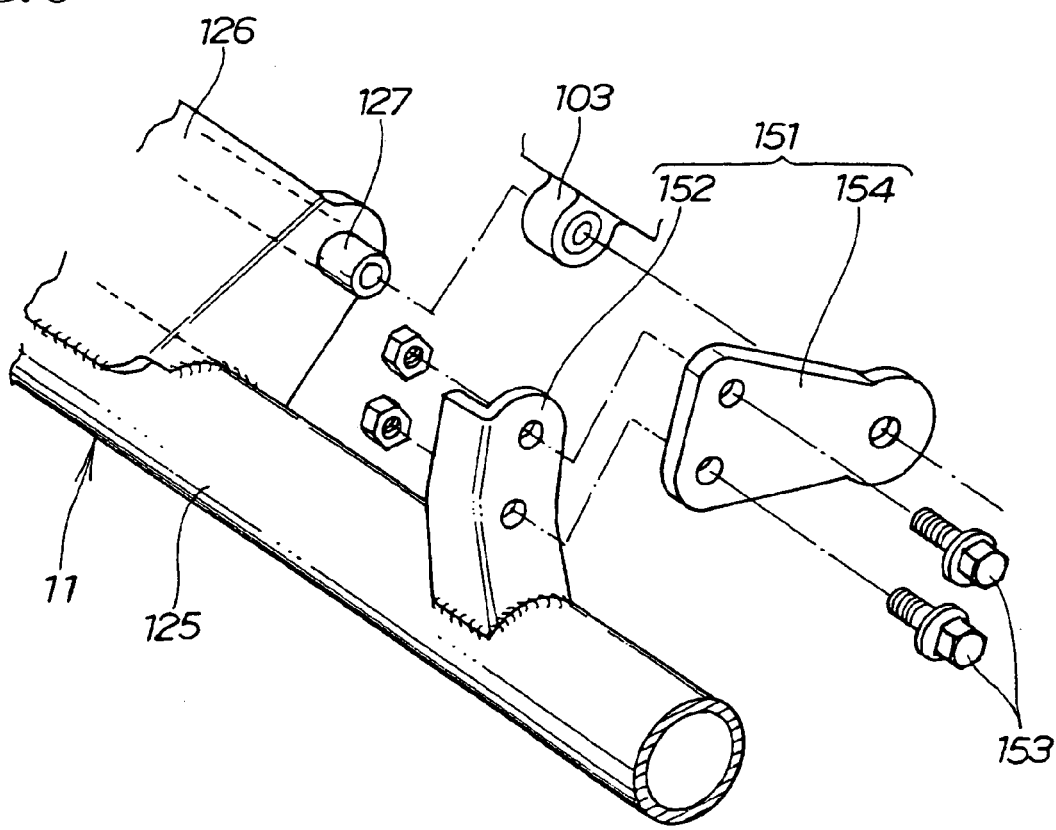
FIG. 8 is an exploded view of the third mounting structure of the engine.

FIG. 7 is a left side view of the third mounting structure of the engine. FIG. 8 is an exploded view of the third mounting structure of the engine.

As shown in FIG. 6, the second mounting structure of the engine 16 includes the left-right pair of lower mount brackets 102, 102 that are clamped between the left-right pair of auxiliary brackets 141, 142, and the pivot shaft 134 is made to penetrate through the lower bracket 123, the left-right pair of lower mount brackets 102, 102 and the left-right pair of auxiliary brackets 141, 142. Thus, the brackets 123, 102, 102, 141, 142 are connected to each other. A washer 143 is provided.

Thus, in the second mounting structure, the vehicle body frame 11 is provided with the left-right pair of auxiliary brackets 141, 142 disposed on both sides in the vehicle body width direction of the lower bracket 123 with an interval therebetween, in addition to the lower bracket 123 (vehicle body side bracket), whereby the left-right pair of lower mount brackets (engine-side brackets) 102, 102 clamping therebetween both sides in the vehicle body width direction of the lower bracket 123 are further clamped between the left-right pair of auxiliary brackets 141, 142, and the pivot shaft (engine support bolt) 134 is made to penetrate through the brackets 123, 102, 102, 141, 142 to thereby connect them to each other.

As a result, vibrations of the engine 16 in the vehicle body width direction, the vertical direction and the front-rear direction relative to the vehicle body frame 11 can be restricted, irrespectively of the hardness of the rubber bushings (elastic members) 133, 133 for mounting the engine 16 onto the lower bracket 123. Therefore, it is possible to sufficiently secure the feeling of unity between the vehicle body frame 11 and the engine 16 in the cases where, for example, the motorcycle 10 (see FIG. 5) is operated while turning, and to further reduce the operating vibration transmitted from the engine 16 to the vehicle body frame 11, through lowering the hardness of the rubber bushings 133, 133. Accordingly, it is possible to further enhance the riding comfort of the motorcycle 10 having the rear fork (rear wheel supporting swing arm) 88 mounted to the engine 16 shown in FIG. 5.

Further, in the second mounting structure, the lower mount bracket 102, 102 are clamped by the left-right pair of auxiliary brackets 141, 142 possessed by the vehicle body frame 11, so that the engine 16 can be restrained from being changed in the vehicle body width direction, the vertical direction and the front-rear direction relative to the vehicle body frame 11. Therefore, the riding comfort of the motorcycle 10 can be further enhanced.

Furthermore, since the lower mount brackets 102, 102 are clamped by the left-right pair of auxiliary brackets 141, 142 possessed by the vehicle body frame 11, dispersion of the mounting accuracy between the vehicle body frame 11 and the engine 16 in the vehicle body width direction can be restrained.

In addition, since the left-right pair of auxiliary brackets 141, 142 are provided on both sides in the vehicle body width direction of the lower bracket (vehicle body side bracket) 123, with an interval therebetween, the support interval of the pivot shaft (engine supporting bolt) 134 can be enlarged, and the feeling of unity between the vehicle body frame 11 and the engine 16 can be secured more effectively.

In addition, in the second mounting structure, a collar 145 with a flange 144 through which the pivot shaft 134 is passed is interposed between the right lower mount bracket 102 and the right auxiliary bracket 142. The flange 144 is directed toward an end surface of the right lower mount bracket 102, and is opposed to the end surface of the lower mount bracket 102 with the left-right vibration-absorbing elastic member 137 therebetween.

Thus, in the second mounting structure, the collar 145 with the flange 144 through which the pivot shaft 134 is passed is interposed between the lower mount bracket 102 and the auxiliary bracket 142, whereby mounting is achieved. As a result, a space corresponding to the length of the collar 145 can be provided between the left and right auxiliary brackets 141, 142.

The engine 16 can be mounted onto the vehicle body frame 11 by a method in which the left and right lower mount brackets 102, 102 are matchedly positioned between the lower bracket 123 and the left and right auxiliary brackets 141, 142. With this arrangement the collar 145 is provided with the flange 144 being interposed. Thereafter, the pivot shaft 134 is passed through the brackets 123, 102, 102, 141, 142 and the collar 145. Thus, at the time of mounting the engine 16 onto the vehicle body frame 11, it suffices to finally mount the collar 145 with the flange 144. Since the space corresponding to the axial length of the collar 145 is provided, it is easy to matchingly position the left and right lower mount brackets 102, 102 between the lower bracket 123 and the left and right auxiliary brackets 141, 142.

Therefore, mountability is good, notwithstanding the complicated structure in which the left-right pair of lower mount brackets 102, 102 clamping therebetween both sides in the vehicle body width direction of the lower bracket 123 are further clamped between the left and right auxiliary brackets 141, 142, and the pivot shaft 134 is made to penetrate through these brackets 123, 102, 102, 141, 142 to thereby connect them to each other.

Further, since the flange 144 of the collar 145 is mounted in the state of being directed to the end surface of the lower mount bracket 102, the load exerted from the lower mount bracket 102 in the vehicle body width direction can be received more satisfactorily.

As shown in FIG. 6, the third mounting structure of the engine 16 includes the left-right pair of front mount brackets 103, 103 that are clamped by the left-right pair of auxiliary brackets 151, 151, and the pivot shaft 136 is made to penetrate through the front bracket 126, the left-right pair of front mount brackets 103, 103 and the left-right pair of auxiliary bracket 151, 151 to thereby connect the brackets 126, 103, 103, 151, 151 to each other.

Thus, in the third mounting structure, the vehicle body frame 11 is provided with the left-right pair of auxiliary brackets 151, 151 on both sides in the vehicle body width direction of the front bracket (vehicle body side bracket) 126, with an interval therebetween, in addition to the front bracket 126, whereby the left-right pair of front mount brackets (engine-side brackets) 103, 103 clamping therebetween both sides in the vehicle body width direction of the front bracket 126 are further clamped between the left and right auxiliary brackets 151, 151, and the pivot shaft 136 is made to penetrate through the brackets 126, 103, 103, 151, 151 to thereby connect them to each other.

As a result, vibrations of the engine 16 in the vehicle body width direction, the vertical direction and the front-rear direction relative to the vehicle body frame 11 can be restrained, irrespectively of the hardness of the rubber bushings (elastic members) 135, 135 for mounting the engine 16 onto the front bracket 126. Therefore, it is possible to sufficiently secure the feeling of unity between the vehicle body frame 11 and the engine 16 in the cases where, for example, the motorcycle 10 (see FIG. 5) is operated while turning, and to further reduce the operating vibration transmitted from the engine 16 to the vehicle body frame 11, through lowering the hardness of the rubber bushings 135, 135. Accordingly, the riding comfort of the motorcycle 10 having the rear fork 88 mounted to the engine 16 shown in FIG. 5 can be further enhanced.

Further, in the third mounting structure, since the front mount brackets 103, 103 are clamped by the left-right pair of auxiliary brackets 151, 151 possessed by the vehicle body frame 11, it is possible to restrain the engine 16 from being changed in the vehicle body width direction relative to the vehicle body frame 11 during operating of the motorcycle 10. Therefore, the riding comfort of the motorcycle 10 can be further enhanced.

Furthermore, since the front mount brackets 103, 103 are clamped by the left-right pair of auxiliary brackets 151, 151 possessed by the vehicle body frame 11, dispersion of the mounting accuracy between the vehicle body frame 11 and the engine 16 in the vehicle body width direction can be suppressed.

As shown in FIGS. 6 to 8, the left-right pair of auxiliary brackets 151, 151 are composed respectively of bracket base portion halves 152, 152 provided in the vehicle body frame 11, and bracket tip end portion halves 154, 154 detachably attached to the bracket base portion halves 152, 152 respectively by bolts 153, 153, and the bracket tip end portion halves 154, 154 are connected to the front mount brackets 103, 103 and the front bracket 126 by a pivot shaft 136.

Thus, by changing the rigidity of the bracket tip end portion halves 154, 154 detachable from the bracket base portion halves 152, 152 (the rigidity is changed by changing, for example, the shape, plate thickness, or material), the supporting rigidity in supporting the engine 16 by the left-right pair of auxiliary brackets 151, 151 can be easily regulated to an optimum level.

Further, the third mounting structure includes the front bracket 126 that extends rearwardly and upwardly from the second cross member 125, while the left-right pair of bracket base portion halves 152, 152 extend upwardly from the second cross member 125, and the left-right pair of bracket tip end portion halves 154, 154 extend from the left-right pair of bracket base portion halves 152, 152 toward the front bracket 126 and are connected by the pivot shaft 136. Thus, these components are arranged in a roughly triangular form as viewed from a vehicle body lateral side.

The third mounting structure is so configured that the front bracket 126, the bracket base portion half 152 and the bracket tip end portion half 154 are arranged in a roughly triangular form as viewed from a vehicle body lateral side. Since the third mounting structure, i.e., the engine supporting portion, is thus configured in a roughly triangular form as viewed from a vehicle body lateral side, the supporting rigidity can be further enhanced.

The left-right pair of bracket base portion halves 152, 152 is roughly L-shaped as viewed from the tip end side. This ensures that the supporting rigidity of the bracket base portion halves 152, 152 can be enhanced with a simple configuration.

The left-right pair of bracket tip end portion halves 154, 154 are connected to the left-right pair of bracket base portion halves 152, 152, respectively, at two upper and lower points by the bolts 153, 153, whereby they are connected at three points, i.e., the two points of connection portions and the point of connection by the pivot shaft 136 as viewed from a vehicle body lateral side.

The left-right pair of tip end portion halves 154, 154 are connected to the left-right pair of bracket base portion halves 152, 152, respectively, at the upper and lower two points and are connected to the engine 16 at one point of connection by the pivot shaft (engine supporting bolt) 136.

Thus, as viewed from a vehicle body lateral side, the bracket tip end portion halves 154, 154 are connected to the front bracket 126 and the bracket base portion halves 152, 152 provided in the vehicle body frame 11 at the three points arranged in a roughly triangular form, so that the connection rigidity and supporting rigidity of the bracket tip end portion halves 154, 154 can be enhanced.

As shown in FIGS. 5 and 6, the first mounting structure of the engine 16 includes the following configuration.

The vehicle body frame 11 includes the left-right pair of upper brackets 121, 121 which are provided at positions other than the positions of the lower bracket 123, the front bracket 126, the left-right pair of auxiliary brackets 141, 142 and the auxiliary brackets 151, 151 and on the Lipper side relative to the swinging center P2 of the rear fork (rear wheel supporting swing arm) 88 swingably mounted to the engine 16.

The engine 16 is provided with the upper mount brackets 101, 101 at other positions than the positions of the left-right pair of lower mount brackets 102, 102 and the left-right pair of front mount brackets 103, 103 and on the upper side relative to the swinging center P2.

The first mounting structure includes the upper mount brackets 101, 101 that are clamped between the left-right pair of upper brackets 121, 121 through the collars 138, 138, whereby an upper portion of the engine 16 is mounted to the pair of upper brackets 121, 121 through the rubber bushings 131, 131.

Thus, in the first mounting structure, the upper mount brackets (engine-side upper brackets) 101, 101 are clamped by the left-right pair of upper brackets 121, 121 at positions other than the positions of the lower and front brackets 123, 126 and the left-right pairs of auxiliary brackets 141, 142, 151, 151 of the vehicle body frame 11 and on the upper side relative to the swinging center P2 of the rear fork 88 swingably mounted to the engine 16, whereby an upper portion of the engine 16 is mounted to the left and right upper brackets 121, 121 through the rubber bushings (upper elastic members) 131, 131.

The operating vibration transmitted from the rear wheel 18 (FIG. 4) to the engine 16 through the rear fork 88 can be moderated by absorbing the vibration by the rubber bushings 131, 131 of the left and right upper brackets 121, 121 present on the upper side relative to the swinging center P2. Therefore, the riding comfort of the motorcycle 10 can be further enhanced.

Furthermore, the supporting rigidity of the first mounting structure (supporting portion) for supporting the engine 16 by only the left and right upper brackets 121, 121 is lower than the supporting rigidity of the second and third mounting structures (supporting portions) for supporting the engine 16 by the cooperation of the lower and front brackets 123, 126 with the left-right pairs of auxiliary brackets 141, 142, 151, 151. Thus, it is possible to suppress the burden on the supporting portions for supporting the engine 16 by the left and right upper brackets 121, 121 which are located on the upper side relative to the swinging center P2 of the rear fork 88.

The above description will be summed up as follows. As shown in FIGS. 5 and 6, the first, second and third mounting structures include the rubber bushing 131 that is attached to the upper bracket 121 located at an upper level relative to the cylinder 54, whereby the rubber bushing 131 for the upper mount bracket 101 is attached to the upper pipe 115 and at an upper level relative to the cylinder 54. The rubber bushing 133 is attached to the lower bracket 123 located at a lower level relative to the cylinder 54. Thus, the rubber bushing 133 for the lower mount bracket 102 is attached to the upper pipe 115 and at a lower level relative to the cylinder 54.

Further, the present invention includes the rubber bushing 131 for the upper mount bracket 101 that is disposed at an upper level relative to the swinging center P2 of the rear fork 88, and the rubber bushing 133 for the lower mount bracket 102 that is disposed at a lower level relative to the swinging center P2 of the rear fork 88.

When the motorcycle 10 is operated, the rear wheel 18 (see FIG. 4) is vibrated according to the conditions of the road surface. This vibration is referred to as "the operating vibration."

Since the engine 16 is mounted to the vehicle body frame 11 through the rubber bushings (elastic members) 131, 133, 135, the operating vibration transmitted from the rear wheel 18 to the engine 16 through the rear fork 88 is alleviated by the rubber bushings 131, 133, 135, whereby it can be made difficult for the operating vibration to be transmitted to the vehicle body frame 11. Therefore, the riding comfort of the motorcycle 10 having the rear fork 88 swingably mounted to the crankcase 52 can be enhanced.

Further, by extending the cylinder 54 forwards from the crankcase 52, spaces are formed on the upper and lower sides of the crankcase 52. By utilizing these upper and lower surplus spaces, the rubber bushings 131, 133 are disposed respectively at the upper and lower levels relative to the cylinder 54, and the rubber bushings 131, 133 are mounted to the upper pipe 115 substantially orthogonal to the cylinder 54 in side view. Namely, the rubber bushings 131, 133 are disposed, respectively, at the upper and lower levels relative to the swinging center P2.

Therefore, it is easy to secure the spaces for arranging the rubber bushings 131, 133. In addition, the structure of the vehicle body frame 11 for mounting the rubber bushings 131, 133 is simple. Furthermore, a sufficient distance can be secured between the upper and lower rubber bushings 131, 133.

Due to the operating vibration, a moment is exerted on the crankcase 52 (cases) of the engine 16, with the upper rubber bushing 131 as a center or with the lower rubber bushing 133 as a center. The force acting on the upper or lower rubber bushing 131, 133 due to the moment is smaller as the distance between the upper and lower rubber bushings 131, 133 is larger.

As above-mentioned, according to the present invention, the rubber bushings 131, 133 are arranged, respectively, at the upper and lower levels relative to the cylinder 54. In other words, the rubber bushings 131, 133 are disposed respectively at the upper and lower levels relative to the swinging center P2 of the rear fork 88. Therefore, the distance between the rubber bushings 131, 133 can be set large. As a result, the forces acting on the rubber bushings 131, 133 are small, whereby the vibration-absorbing performance of the rubber bushings 131, 133 is enhanced. Accordingly, the operating vibration transmitted to the engine 16 can be further alleviated by the rubber bushings 131, 133, whereby it can be made difficult for the operating vibration to be transmitted to the vehicle body frame 11, and the riding comfort can be further enhanced.

Incidentally, in the mode for carrying out the present invention, the motorcycle 10 is not limited to the motor scooter type motorcycle.

The engine 16 is not limited to a 2-cylinder engine but may be a single-cylinder engine or a multi-cylinder engine.

The rear shock absorbers 19 are not limited to the left and right two units but may be one unit.

The front arm 81 constituting the rear fork 88 may be vertically swingably mounted to the crankcase 52 directly, instead of through the generator cover 66.

The rear fork 88 is not limited to the combined structure of the transmission mechanism case 72 with the front and rear arms 81, 86. For example, the arm members alone may be used, without being combined with the transmission mechanism case 72. In addition, the rear fork 88 may be constituted by a single member.

It suffices for the third mounting structure to be so configured that at least one of the left-right pair of auxiliary brackets 151, 151 is composed of the bracket base portion half 152 provided in the vehicle body frame and the bracket tip end portion half 154 detachably attached to the bracket base portion half 152.

It suffices for the collar 145 with the flange 144 to be interposed at least one of the left and right portions between the left-right pair of lower mount brackets (engine-side brackets) 102, 102 and the left-right pair of auxilary brackets 141, 142.

The engine mounting structure according to the present invention is preferable for application to motorcycles in which both sides in the vehicle body width direction of vehicle body side brackets provided in a vehicle body frame are clamped between a left-right pair of engine-side brackets provided on an engine, and the engine is mounted to the vehicle body side brackets through an elastic member.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An engine mounting structure for a motorcycle such that a rear wheel supporting swing arm is vertically swung together with the vertical swinging of a rear wheel, both sides in a vehicle body width direction of a first vehicle body side bracket provided in a vehicle body frame is clamped between a first left-right pair of engine-side brackets provided on an engine, and said engine is mounted to said vehicle body side bracket through an elastic member, comprising:
    a first left-right pair of auxiliary brackets disposed on both sides of said first vehicle body side bracket with an interval therebetween, said first left-right pair of engine-side brackets being clamped between said first left-right pair of auxiliary brackets; and
    a first engine support bolt penetrating through said first vehicle body side bracket, said first left-right pair of engine-side brackets and said first left-right pair of auxiliary brackets for connecting these brackets to each other,
    wherein a flanged collar with said first engine support bolt passed therethrough is interposed at least to a left or right of a portion between one of said first left-right pair of engine-side brackets and one of said first left-right pair of auxiliary brackets, and
    wherein the flange is directed toward an end surface of the one of the first left-right engine-side brackets on a side on which said flanged collar is interposed.

2. The engine mounting structure for a motorcycle according to claim 1, wherein said vehicle body frame includes a left-right pair of vehicle body side upper brackets provided at other positions than the positions of said first vehicle body side bracket and said first left-right pair of auxiliary brackets and on the upper side relative to the swinging center of said rear wheel supporting swing arm swingably mounted to said engine and said engine is provided with an engine-side upper bracket at a position other than the positions of said first left-right pair of engine-side brackets and on the upper side relative to said swinging center, and
    said engine-side upper bracket is clamped between said left-right pair of vehicle body side upper brackets, whereby an upper portion of said engine is mounted to said left-right pair of vehicle body side upper brackets through an upper elastic member.

3. The engine mounting structure for a motorcycle according to claim 1, further comprising a second left-right pair of auxiliary brackets, wherein said second left-right pair of auxiliary brackets includes a bracket base portion half provided in said vehicle body frame, and a bracket tip end portion half detachably attached to said bracket base portion half, said bracket tip end portion half being connected to a second engine-side bracket by a second engine support bolt.

4. The engine mounting structure for a motorcycle according to claim 3, wherein said vehicle body frame includes a left-right pair of vehicle body side upper brackets provided at other positions than the positions of said first vehicle body side bracket and said first left-right pair of auxiliary brackets and on the upper side relative to the swinging center of said rear wheel supporting swing arm swingably mounted to said engine and said engine is provided with an engine-side upper bracket at a position other than the positions of said first left-right pair of engine-side brackets and on the upper side relative to said swinging center, and
    said engine-side upper bracket is clamped between said left-right pair of vehicle body side upper brackets, whereby an upper portion of said engine is mounted to said left-right pair of vehicle body side upper brackets through an upper elastic member.

5. The engine mounting structure for a motorcycle according to claim 3, wherein said bracket base portion half includes a left-right pair of bracket base portion halves, and said bracket tip end portion half includes a left-right pair of bracket tip end halves,
    wherein said vehicle body frame comprises a cross member disposed on the lower side of a cylinder head of said engine and extending in the vehicle body width direction, a second vehicle body side bracket extends rearwardly and upwardly from said cross member, whereas said left-right pair of bracket base portion halves extend upwardly from said cross member, and said left-right pair of bracket tip end halves extend from said left-right pair of bracket base portion halves toward said second vehicle body side bracket and are connected by said second engine support bolt, whereby said second vehicle body side bracket, and
    wherein each of said bracket base portion halves and said bracket tip end halves is disposed in a roughly triangular form as viewed from a vehicle body lateral side.

6. The engine mounting structure for a motorcycle according to claim 5, wherein said left-right pair of bracket base portion halves are roughly L-shaped as viewed from the tip end side.

7. The engine mounting structure for a motorcycle according to claim 5, wherein said left-right pair of bracket tip end portion halves are connected to said left-right pair of bracket base portion halves, respectively, at upper and lower two points, and are connected to said engine at one of the points of connection by said second engine support bolt.

8. The engine mounting structure for a motorcycle according to claim 3, wherein said left-right pair of bracket tip end portion halves are connected to said left-right pair of bracket base portion halves, respectively, at upper and lower two points, and are connected to said engine at one of the points of connection by said second engine support bolt.

9. The engine mounting structure for a motorcycle according to claim 3, wherein said left-right pair of bracket base portion halves are roughly L-shaped as viewed from the tip end side.

10. An engine mounting structure for a motorcycle having a rear wheel supporting swing arm vertically swung together with the vertical swinging of a rear wheel comprising:
- a left side and a right side of a vehicle body including a first vehicle side bracket of a vehicle body frame clamped between a first left-right pair of engine-side brackets provided on an engine with said engine being mounted to said first vehicle body side bracket through an elastic member;
- a first left-right pair of auxiliary brackets disposed on both sides of said first vehicle body side bracket with an interval therebetween, said first left-right pair of engine-side brackets being clamped between said first left-right pair of auxiliary brackets; and
- a first engine support bolt penetrating through said first vehicle body side bracket, said first left-right pair of engine-side brackets and said first left-right pair of auxiliary brackets for connecting these brackets to each other,
- wherein a flanged collar with said first engine support bolt passed therethrough is interposed at least to a left or right of a portion between one of said first left-right pair of engine-side brackets and one of said first left-right pair of auxiliary brackets, and
- wherein the flange is directed toward an end surface of the one of the first left-right engine-side brackets on a side on which said flanged collar is interposed.

11. The engine mounting structure for a motorcycle according to claim 10, wherein said vehicle body frame includes a left-right pair of vehicle body side upper brackets provided at other positions than the positions of said first vehicle body side bracket and said first left-right pair of auxiliary brackets and on the upper side relative to the swinging center of said rear wheel supporting swing arm swingably mounted to said engine and said engine is provided with an engine-side upper bracket at a position other than the positions of said first left-right pair of engine-side brackets and on the upper side relative to said swinging center, and
- said engine-side upper bracket is clamped between said left-right pair of vehicle body side upper brackets, whereby an upper portion of said engine is mounted to said left-right pair of vehicle body side upper brackets through an upper elastic member.

12. The engine mounting structure for a motorcycle according to claim 10, further comprising a second left-right pair of auxiliary brackets, wherein said second left-right pair of auxiliary brackets includes a bracket base portion half provided in said vehicle body frame, and a bracket tip end portion half detachably attached to said bracket base portion half, said bracket tip end portion half being connected to a second engine-side bracket by a second engine support bolt.

13. The engine mounting structure for a motorcycle according to claim 12, wherein said vehicle body frame includes a left-right pair of vehicle body side upper brackets provided at other positions than the positions of said first vehicle body side bracket and said first left-right pair of auxiliary brackets and on the upper side relative to the swinging center of said rear wheel supporting swing arm swingably mounted to said engine and said engine is provided with an engine-side upper bracket at a position other than the positions of said first left-right pair of engine-side brackets and on the upper side relative to said swinging center, and
- said engine-side upper bracket is clamped between said left-right pair of vehicle body side upper brackets, whereby an upper portion of said engine is mounted to said left-right pair of vehicle body side upper brackets through an upper elastic member.

14. The engine mounting structure for a motorcycle according to claim 12, wherein said bracket base portion half includes a left-right pair of bracket base portion halves, and said bracket tip end portion half includes a left-right pair of bracket tip end halves,
- wherein said vehicle body frame comprises a cross member disposed on the lower side of a cylinder head of engine and extending in the vehicle body width direction, said second vehicle body side bracket extends rearwardly and upwardly from said cross member, whereas said left-right pair of bracket base portion halves extend upwardly from said cross member, and said left-right pair of bracket tip end halves extend from said left-right pair of bracket base portion halves toward said second vehicle body side bracket and are connected by said second engine support bolt whereby said second vehicle body side bracket, and
- wherein each of said bracket base portion halves and said bracket tip end halves is disposed in a roughly triangular form as viewed from a vehicle body lateral side.

15. The engine mounting structure for a motorcycle according to claim 14, wherein said left-right pair of bracket base portion halves are roughly L-shaped as viewed from the tip end side.

16. The engine mounting structure for a motorcycle according to claim 14, wherein said left-right pair of bracket tip end portion halves are connected to said left-right pair of bracket base portion halves, respectively, at upper and lower two points, and are connected to said engine at one of the points of connection by said second engine support bolt.

17. The engine mounting structure for a motorcycle according to claim 12, wherein said left-right pair of bracket base portion halves are roughly L-shaped as viewed from the tip end side.

18. The engine mounting structure for a motorcycle according to claim 12, wherein said left-right pair of bracket tip end portion halves are connected to said left-right pair of bracket base portion halves, respectively, at upper and lower two points, and are connected to said engine at one of the points of connection by said second engine support bolt.

19. An engine mounting structure for a motorcycle having a rear wheel supporting swing arm vertically swung together with the vertical swinging of a rear wheel comprising:

a left side and a right side of a vehicle body including a first vehicle side bracket of a vehicle body frame clamped between a first left-right pair of engine-side brackets provided on an engine with said engine being mounted to said first vehicle body side bracket through an elastic member;

a first left-right pair of auxiliary brackets disposed on both sides of said first vehicle body side bracket with an interval therebetween, said first left-right pair of engine-side brackets being clamped between said first left-right pair of auxiliary brackets;

a first engine support bolt penetrating through said first vehicle body side bracket, said first left-right pair of engine-side brackets and said first left-right pair of auxiliary brackets for connecting these brackets to each other; and a second left-right pair of auxiliary brackets, wherein said second left-right pair of auxiliary brackets includes a bracket base portion half provided in said vehicle body frame, and a bracket tip end portion half detachably attached to said bracket base portion half, said bracket tip end portion half being connected to a second engine-side bracket by a second engine support bolt.

* * * * *